United States Patent
Casati et al.

(10) Patent No.: US 8,394,868 B2
(45) Date of Patent: Mar. 12, 2013

(54) POLYOL PREPOLYMERS OF NATURAL OIL BASED POLYOLS

(75) Inventors: Francois M. Casati, Pfaffikon (CH); Imran Munshi, Au (CH)

(73) Assignee: Dow Global Technologies LLC, Midland, MI (US)

(*) Notice: Subject to any disclaimer, the term of this patent is extended or adjusted under 35 U.S.C. 154(b) by 8 days.

(21) Appl. No.: 12/676,229

(22) PCT Filed: Jun. 11, 2009

(86) PCT No.: PCT/US2009/047004
§ 371 (c)(1), (2), (4) Date: Mar. 3, 2010

(87) PCT Pub. No.: WO2009/152304
PCT Pub. Date: Dec. 17, 2009

(65) Prior Publication Data
US 2011/0086215 A1  Apr. 14, 2011

Related U.S. Application Data

(60) Provisional application No. 61/060,965, filed on Jun. 12, 2008.

(51) Int. Cl.
*C08G 18/28* (2006.01)
(52) U.S. Cl. ........ 521/159; 521/130; 521/170; 521/174; 528/74.5; 528/85
(58) Field of Classification Search .................. 521/130, 521/159, 170, 174; 528/85, 74.5
See application file for complete search history.

(56) References Cited

U.S. PATENT DOCUMENTS

| 4,147,678 | A | * | 4/1979 | Mao et al. ................. 524/100 |
| 4,423,162 | A | | 12/1983 | Peerman et al. |
| 4,534,907 | A | | 8/1985 | Peerman et al. |
| 4,543,369 | A | | 9/1985 | Peerman et al. |
| 4,640,801 | A | | 2/1987 | Simone et al. |
| 6,107,433 | A | | 8/2000 | Petrovic et al. |
| 6,121,398 | A | | 9/2000 | Wool et al. |
| 6,399,698 | B1 | | 6/2002 | Petrovic et al. |
| 6,891,053 | B2 | | 5/2005 | Chasar et al. |
| 6,897,283 | B2 | | 5/2005 | Gerber et al. |
| 6,962,636 | B2 | | 11/2005 | Kurth et al. |
| 6,979,477 | B2 | | 12/2005 | Kurth et al. |
| 2007/0232711 | A1 | * | 10/2007 | Frei et al. .................. 521/128 |
| 2008/0076842 | A1 | | 3/2008 | Ferenz et al. |

FOREIGN PATENT DOCUMENTS

| EP | 1 842 866 A1 | 10/2007 |
| GB | 1537039 A | 12/1978 |
| WO | WO-01/25184 A1 | 4/2001 |
| WO | WO-2004/020497 A1 | 3/2004 |
| WO | WO-2004/096744 A2 | 11/2004 |
| WO | WO-2004/096882 A1 | 11/2004 |
| WO | WO-2004/096883 A1 | 11/2004 |
| WO | WO-2005/108455 A2 | 11/2005 |
| WO | WO-2006/047434 A1 | 5/2006 |

OTHER PUBLICATIONS

Polyurethane Handbook: Chemistry, Raw Materials, Processing, Application, Properties edited by G. Oertel, Hanser Publisher (1993, second edition), section 3.1.1.2.

* cited by examiner

*Primary Examiner* — John Cooney

(57) ABSTRACT

A polyol prepolymer having at least one urethane group is disclosed. The polyol preopolymer is a reaction product of at least one isocyanate and a polyol blend, where the polyol blend includes at least one conventional petroleum-based polyol and at least one natural oil based polyol. The polyol prepolymer may be used in producing flexible polyurethane foams.

20 Claims, No Drawings

POLYOL PREPOLYMERS OF NATURAL OIL BASED POLYOLS

CROSS-REFERENCE TO RELATED APPLICATIONS

This application claims benefit of U.S. Provisional Patent Application Ser. No. 61/060,965, filed Jun. 12, 2008, entitled "Polyol Prepolymers of Natural Oil Based Polyols" which is herein incorporated by reference.

BACKGROUND

1. Field of the Invention

Embodiments of the present invention generally relate to polyurethane production; more specifically to polyol prepolymers useful in polyurethane foam production.

2. Description of the Related Art

Polyether polyols based on the polymerization of alkylene oxides, polyester polyols, or combinations thereof, are together with isocyanates the major components of a polyurethane system. One class of polyols are conventional petroleum-based polyols, and another class are those polyols made from vegetable oils or other renewable feedstocks. These polyols are also called natural oil based polyols (NOBP). Natural oil based polyols may be sold and marketed as a component of polyol blends which often also may include conventional petroleum-based polyols. Because the natural oil based polyols contain fatty groups, i.e. long chains of saturated and/or unsaturated hydrocarbons, the natural oil based polyols have hydrophobic characteristics and may therefore not be miscible or otherwise compatible with conventional petroleum-based polyols. Furthermore, natural oil based polyols may be lower in density than conventional petroleum based polyether polyols. This difference in densities may also be a contributing factor to phase separation and haziness of the polyol blends.

The quality of the polyol blends may be linked to the quality of the polyurethane product. For example, phase separation in the polyol blends and the blend's incompatibility with water may result in polyurethane foams exhibiting shrinkage, large shot-holes, or large pin-holes. Polyol blend quality also may be a factor when natural oil based polyols are used as alternatives to conventional polyester polyols in the manufacture of flexible slabstock foams which are flame laminated to fabric or other surfaces. A regular cell structure of such foams may be preferred for optimized adhesion and optical/visual character of the composite, often used in upholstery of automotive seating or in garments.

Therefore, a natural oil based polyol which is more compatible with water and/or other polyols and is able to give regular foam cell structure is needed.

SUMMARY

The embodiments of the present invention satisfy the needs a natural oil based polyol which is more compatible with water and/or other polyols and which may be used to produce flexible slabstock foam with regular cell structure. The embodiments of the invention may also improve control of the cell size of the foam which may result in better foam appearance, foam breath-ability, or foam hardness. For example, described herein is a natural oil based polyol prepolymer which can be used in preparing a polyurethane foam. The polyol prepolymer exhibits enhanced compatibility with both water and other conventional petroleum based polyols, and therefore enables the use of high molecular weight polyols based on renewable resources in polyurethane production.

In one embodiment of the invention, a polyol prepolymer having at least one urethane group is provided. The polyol prepolymer includes a reaction product of at least one isocyanate and a natural oil based polyol. The polyol blend may include at least one conventional petroleum-based polyol and at least one natural oil based polyol. To get the polyol prepolymer the isocyanate is reacted at an isocyanate index of between about 5 and about 80, and the polyol prepolymer has a viscosity of between about 3000 mPa·s and about 30000 mPa·s at 25 deg Celsius.

In another embodiment of the invention, a flexible polyurethane foam is provided. The foam includes the product of a reaction product of at least: a) at least one polyol prepolymer, wherein the at least one polyol prepolymer includes a reaction product of at least one first isocyanate and a polyol blend, wherein the polyol blend includes at least one conventional petroleum-based polyol and at least one natural oil based polyol, the at least one first isocyanate is reacted at an isocyanate index of between about 5 and about 80, and the polyol prepolymer has a viscosity of between about 3000 mPa·s and about 30000 mPa·s at 25° Celsius; and b) at least one second isocyanate, which may be the same or different as the at least one first isocyanate.

In another embodiment of the invention, a method for producing a polyol prepolymer is provided. The method includes providing at least one natural oil based polyol and, optionally, another polyol made from petroleum or from renewable resources. The polyol or polyol blend is reacted with at least one isocyanate at an isocyanate index of between about 5 and about 80 to form the at least one polyol prepolymer, such that the polyol prepolymer has a viscosity of between about 3000 mPa·s and about 30000 mPa·s at 25 deg C.

In another embodiment of the invention, a method for forming flexible polyurethane is provided. The method includes forming at least one polyol prepolymer by providing a polyol blend comprising at least one conventional petroleum-based polyol and at least one natural oil based polyol, and reacting the polyol blend with at least one first isocyanate at an isocyanate index of between about 5 and about 80 to form the at least one polyol prepolymer, such that the polyol prepolymer has a viscosity of between about 3000 mPa·s and about 3000 mPa·s at 25° Celsius. The at least one polyol prepolymer is reacted with at least one second isocyanate, which may be the same or different as the at least one first isocyanate, to form a polyurethane foam.

DETAILED DESCRIPTION

Embodiments of the present invention provide for polyol prepolymers useful in polyurethane foam production. The polyol prepolymers exhibit little or no phase separation, even with a significant amount of water present. The polyol prepolymers also have higher viscosities than blends of similar (non-prepolymer) polyols, and may be used in producing flexible foams with a regular cell structure.

The polyol prepolymers may be used to form polyurethane foams. The higher viscosities of the polyol prepolymers may help control the cell structure of the polyurethane foams as the foams are formed. For example, by using the polyol preopolymers, according to the embodiments of the invention, it may be possible to control the cell structure so that the foams may have different cell size and no pin-holes larger than about 0.5 mm in diameter. Increased control of the cell structure may play a factor during flame lamination processes where a foam is bonded or adhered to a substrate such as wood, textile, metal, foil, or another polymer (for example, a film or another foam) and may be preferable for aesthetic reasons.

The polyol prepolymers may be made preparing a polyol blend and reacting the blend with an isocyanate. The polyol blend includes at least one natural oil based polyol and, optionally, at least one conventional petroleum-based polyol. Any ratio of natural oil based polyol to conventional petroleum-based polyol is contemplated. The ratio may be between about 10:90 and about 90:10 parts by weight based on the combined weight of the natural oil based polyol and the conventional petroleum-based polyol. In one embodiment the ratio is between about 20:80 and about 80:20. In another embodiment the ratio is between about 40:60 and about 60:40. In another embodiment the ratio is about 50:50.

The natural oil based polyols are polyols based on or derived from renewable feedstock resources such as natural and/or genetically modified (GMO) plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least about 85 percent by weight unsaturated fatty acids. Examples of suitable vegetable oils include, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used.

For use in the production of polyurethane foams, the natural material may be modified to give the material isocyanate reactive groups or to increase the number of isocyanate reactive groups on the material. Such reactive groups may be a hydroxyl group. Several chemistries can be used to prepare the natural oil based polyols. Such modifications of a renewable resource include, for example, epoxidation, hydroxylation, ozonolysis, esterification, hydroformylation, or alkoxylation. Such modifications are commonly known in the art and are described, for example, in U.S. Pat. Nos. 4,534,907, 4,640,801, 6,107,433, 6,121,398, 6,897,283, 6,891,053, 6,962,636, 6,979,477, and PCT publication Nos. WO 2004/020497, WO 2004/096744, and WO 2004/096882.

After the production of such polyols by modification of the natural oils, the modified products may be further alkoxylated. The use of ethylene oxide (EO) or mixtures of EO with other oxides, such as propylene oxide (PO) or butylene oxide (BO), introduce hydrophilic moieties into the polyol. In one embodiment, the modified product undergoes alkoxylation with sufficient EO to produce a natural oil based polyol with between about 10 weight % and about 60 weight % percent EO; preferably between about 20 weight % and about 40 weight % EO.

In another embodiment, the natural oil based polyols are obtained by a multi-step process wherein the animal or vegetable oils/fats is subjected to transesterification and the constituent fatty acids recovered. This step is followed by hydroformylating carbon-carbon double bonds in the constituent fatty acids to form hydroxymethyl groups, and then forming a polyester or polyether/polyester by reaction of the hydroxymethylated fatty acid with an appropriate initiator compound. Such a multi-step process is commonly known in the art, and is described, for example, in PCT publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil derived polyols may be any initiator used in the production of conventional petroleum-based polyols. The initiator may be selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In certain embodiments, the initiator is selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. In one embodiment of the invention, the initiator is glycerol, trimethylopropane, pentaerythritol, sucrose, sorbitol, and/or mixture thereof.

In one embodiment, the initiators are alkoxlyated with ethylene oxide or a mixture of ethylene and at least one other alkylene oxide to give an alkoxylated initiator with a molecular weight between about 200 and about 6000, preferably between about 500 and about 3000, more preferably between about 500 and about 1000.

Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

The functionality of the at least one natural oil based polyol, is above about 1.5 and generally not higher than about 6. In one embodiment, the functionality is below about 4. The hydroxyl number of the at least one natural oil based polyol is below about 300 mg KOH/g, preferably between about 50 and about 300, more preferably between about 60 and about 200. In one embodiment, the hydroxyl number is below about 100.

The level of renewable feedstock in the natural oil based polyol can vary between about 10 and about 100%, usually between about 10 and about 90%.

Combination of two types or more of natural oil based polyols may also be used, either to maximize the level of seed oil in the foam formulation, or to optimize foam processing and/or specific foam characteristics, such as resistance to humid aging.

The viscosity measured at 25° C. of the natural oil based polyols is generally less than about 6,000 mPa·s. Preferably, the viscosity is less than about 4,000 mPa·s, more preferably less than 3,000 mPa·s.

The conventional petroleum-based polyol includes materials having at least one group containing an active hydrogen atom capable of undergoing reaction with an isocyanate, and not having parts of the material derived from a vegetable or animal oil. Suitable conventional petroleum-based polyols are well known in the art and include those described herein and any other commercially available polyol. Mixtures of one or more polyols and/or one or more polymer polyols may also be used to produce polyurethane products according to embodiments of the present invention.

Representative polyols include polyether polyols, polyester polyols, polyhydroxy-terminated acetal resins, hydroxyl-terminated amines and polyamines. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator having from 2 to 8, preferably 2 to 6 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The initiators suitable for the natural oil based polyols may also be suitable for the at least one conventional petroleum-based polyol.

The at least one conventional petroleum-based polyol may for example be poly(propylene oxide) homopolymers, random copolymers of propylene oxide and ethylene oxide in which the poly(ethylene oxide) content is, for example, from about 1 to about 30% by weight, ethylene oxide-capped poly(propylene oxide) polymers and ethylene oxide-capped random copolymers of propylene oxide and ethylene oxide. For slabstock foam applications, such polyethers preferably contain 2-5, especially 2-4, and preferably from 2-3, mainly secondary hydroxyl groups per molecule and have an equivalent weight per hydroxyl group of from about 400 to about 3000, especially from about 800 to about 1750. For high resiliency slabstock and molded foam applications, such polyethers preferably contain 2-6, especially 2-4, mainly primary hydroxyl groups per molecule and have an equivalent weight per hydroxyl group of from about 1000 to about 3000, especially from about 1200 to about 2000. When blends of polyols are used, the nominal average functionality (number of hydroxyl groups per molecule) will be preferably in the ranges specified above. For viscoelastic foams shorter chain polyols with hydroxyl numbers above 150 are also used. For the production of semi-rigid foams, it is preferred to use a trifunctional polyol with a hydroxyl number of 30 to 80.

The polyether polyols may contain low terminal unsaturation (for example, less that 0.02 meq/g or less than 0.01 meq/g), such as those made using so-called double metal cyanide (DMC) catalysts. Polyester polyols typically contain about 2 hydroxyl groups per molecule and have an equivalent weight per hydroxyl group of about 400-1500.

After forming the polyol blend which includes the at least one natural oil based polyol and the at least one conventional petroleum-based polyol, at least one isocyanate is added and reacted with the polyol blend to form a polyol prepolymer. The at least one isocyanate is added to the polyol blend at an isocyanate index of between about 5 and about 80. All individual values and subranges from between about 5 and about 80 are included herein and disclosed herein; for example, the isocyanate index can be between a lower limit of about 5, 8, 10, 12, 20, 25, or 30 and an upper limit of about 30, 35, 40, 45, 50, 55, 60, 65, 70, or 80. For example, the isocyanate index may between about 8 and about 80; or in the alternative, the isocyanate index may between about 10 and about 70; or in the alternative, the isocyanate index may between about 20 and about 60; or in the alternative, the isocyanate index may between about 25 and about 50; or in the alternative, the isocyanate index may between about 30 and about 50; or in the alternative, the isocyanate index may between about 25 and about 45; or in the alternative, the isocyanate index may between about 30 and about 40. The isocyanate index is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation. Thus, at an isocyanate index of 50 or less (a non-stoichiometric amount), no more than half of the isocyanate reactive cites of the polyols are reacted. The unreacted isocyanate reactive cites are thus free to react with additional isocyanates upon the formation of a polyurethane foam.

Isocyanates which may be used in the various embodiments of the present invention include aliphatic, cycloaliphatic, arylaliphatic and aromatic isocyanates. The at least one isocyanate which may be used may be a monoisocyanate, diisocyanate, and/or a polyisocyanate.

Examples of suitable aromatic isocyanates include benzyl isocyanate, the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenylmethane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic isocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, saturated analogues of the above mentioned aromatic isocyanates, and mixtures thereof.

The polyol blend and the at least one isocyanate are mixed as is known in the art. The reactants may be reacted and stirred at room temperature or at elevated temperatures, such as up to about 100° C. The polyol blend and the at least one isocyanate may be stirred for a few seconds or minutes (for example about 2 minutes) up to about a day or more. Furthermore, the polyol blend and the at least one isocyanate may be heated and kept at elevated temperatures to promote the formation of the prepolymer. Temperatures at up to about 100° C. for between about 1 hour and 24 hours may be used. In one embodiment the polyol blend and the at least one isocyanate is heated between about 5 hours and about 7 hours. In one embodiment the polyol blend and the at least one isocyanate are heated for about 6 hours at about 70° C. The reaction to produce the prepolymer can be uncatalyzed or be catalyzed, for instance with an amine, an amine initiated polyol or a metal salt.

It can be appreciated that because primary hydroxyls are generally more reactive than secondary hydroxyls, it is possible to adjust the type of polyols and levels of primary hydroxyls to get desired polyol branching. Additionally the type of polyisocyanate(s), i.e. functionality and reactivity, can also impact the final properties of the prepolymer.

The resulting polyol prepolymers, according to the various embodiments of the invention, have viscosities that are higher than the viscosities of the polyol blends they are made from. The polyol prepolymers may have viscosities of between about 3000 mPa·s and about 30000 mPa·s at 25° C., and OH numbers of between about 100 and about 5. In one embodiment, the viscosity may be between about 3000 mPa·s and about 7000 mPa·s. The viscosities of the polyol prepolymers are similar to those of polyester polyols which are commonly used in producing foams intended for flame lamination. Furthermore, by reacting the natural oil based polyols with a non-stoichiometric amount of isocyanate to maintain free isocyanate reactive groups, the balance of hydrophobicity-hydrophilicity of the natural oil based polyols is changed. Additionally, the polyol prepolymers have increased densities or volumetric masses as compared to the polyol blends the polyol prepolymers are made from. The changes resulted by the formation of the polyol prepolymers improves the natural oil based polyol's compatibility with other polyols and water. Addition of crosslinkers or other additives or fillers, including copolymer polyols, such as SAN (styrene-acrylonitrile) can also help to adjust prepolymer viscosity, hydrophobicity-hydrophylicity balance, reactivity and density It may be possible to add water to the polyol prepolymers without any observed phase separation at water concentrations of up to about 20% based on the total weight of polyol prepolymer and water. In one embodiment no phase separation is observed at water concentrations of up to about 10%. In another embodiment no phase separation is observed at water concentrations of up to about 5%.

It is believed that by using the polyol prepolymers of the various embodiments of the invention in producing foam it is possible to enhance the control of the foam's cell structure as compared to when using the polyol blend directly without first forming a polyol prepolymer. It is believed that because the prepolymer polyols have a higher viscosity than non-prepolymer natural based oil polyols, the polyol prepolymers help stabilize the rising foam while avoiding or minimizing coalescence. In addition, the high viscosity of the polyol prepolymers helps when using low activity surfactants or surfactants giving regular cell structures. In general, the polyurethane foams are prepared by mixing an isocyanate, such as the isocyanates listed above, or combinations thereof, and the polyol prepolymer in the presence of a blowing agent, catalyst(s), surfactant(s) and other optional ingredients as desired. Additional polyols (such as those listed above) and/or polymer polyols may also be added to the polyol prepolymer before polyol prepolymer is reacted with the isocyanate. The conditions for the reaction are such that the polyisocyanate and polyol composition react to form a polyurethane and/or polyurea polymer while the blowing agent generates a gas that expands the reacting mixture.

The polyol composition may also include one or more catalysts for the reaction of the polyol (and water, if present) with the polyisocyanate. Any suitable urethane catalyst may be used, including tertiary amine compounds, amines with isocyanate reactive groups and organometallic compounds. Exemplary tertiary amine compounds include triethylenediamine, N-methylmorpholine, N,N-dimethylcyclohexylamine, pentamethyldiethylenetriamine, tetramethyl-ethylenediamine, bis(dimethylaminoethyl)ether, 1-methyl-4-dimethylaminoethyl-piperazine, 3-methoxy-N-dimethylpropyl amine, N-ethyl morpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate. A catalyst for the trimerization of isocyanates, resulting in a isocyanurate, such as an alkali metal alkoxide may also optionally be employed herein. The amount of amine catalysts can vary from 0.02 to 5 percent in the formulation or organometallic catalysts from 0.001 to 1 percent in the formulation can be used.

Additionally, it may be desirable to employ certain other ingredients in preparing polyurethane polymers. Among these additional ingredients are emulsifiers, silicone surfactants, preservatives, flame retardants, colorants, antioxidants, reinforcing agents, fillers, including recycled polyurethane foam in form of powder.

Slabstock foam may be prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about from about 10 kg/m$^3$ to 80 kg/m$^3$, especially from about 15 kg/m$^3$ to 60 kg/m$^3$, preferably from about 17 kg/m$^3$ to 50 kg/m$^3$ in density.

A slabstock foam formulation may contain from about 1 to about 6, preferably about 2 to about 5 parts by weight water per 100 parts by weight of polyol at atmospheric pressure. At reduced pressure these levels are reduced.

High resilience slabstock (HR slabstock) foam may be made in methods similar to those used to make conventional slabstock foam but using higher equivalent weight polyols. HR slabstock foams are characterized in exhibiting a Ball rebound score of 45% or higher, per ASTM 3574.03. Water levels tend to be from about 2 to about 6, especially from about 3 to about 5 parts per 100 parts (high equivalent) by weight of polyols. Viscoelastic foams are made by using blends of polyols and isocyanates leading to a polymer with a Tg (glass temperature) close to room temperature. Usually those foams have densities higher than 40 kg/m$^3$ and up to 100 kg/m$^3$.

Molded foam can be made according to the invention by transferring the reactants (polyol composition including copolyester, polyisocyanate, blowing agent, and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam. Densities for molded foams generally range from 30 to 60 kg/m$^3$.

Several possibilities exists to implement the embodiments of the invention, such as in-line pre-reaction of the polyol with part of the isocyanate, prior to foaming, degassing of the raw materials, heating or cooling of polyols and isocyanate. While the isocyanate used to make the prepolymer could be different from the one used to produce the final foam, in one embodiment the same isocyanate is used in both steps.

The applications for foams produced by processes described herein are those known in the industry and described in Polyurethane Handbook, by G. Oetel, Hamer publisher. Flexible, semi-rigid and viscoelastic foams find use in applications such as furniture, shoe soles, automobile seats, sun visors, steering wheels, packaging applications, armrests, door panels, noise insulation parts, other cushioning and energy management applications, carpet backing, dashboards and other applications for which conventional flexible polyurethane foams are used. Other applications include coatings, adhesives, and elastomers.

Embodiments of the invention include laminates with at least one foam prepared using the polyol prepolymer described herein and at least one substrate bonded directly adjacent to the foam using a heat bonding process, preferably a flame bonding or high frequency welding process, as described in "Polyurethane Handbook" by G. Oertel, Hanser publishers. Such laminates are structurally distinguished by being bonded through resolidified melted polyurethane rather than through an adhesive having a composition different from the foam or substrate bonded thereto.

Suitable substrates include any material that can be heat bonded to the foam. Such substrates include wood (including wood pulp, pulp composites, lumber, sheets, wood structures), paper, metal (including sheets, structures, foils), fabrics including spun, woven, knitted, felted, matted, non-woven, fleece and the like textile fabrics produced from natural and synthetic fibers such as cotton, wool, silk, linen, jute, hemp, sisal, nylon, polyester, polyacrylonitrile, vinylchloride-acrylonitrile copolymer, polyester, polyamide, rayon, polyurethane, spandex and the like and combinations thereof. Other useful substrates include plastic film, sheets, structures or foams prepared from melamine or melamine-formaldehyde, polyether polyurethane, polyester polyurethane, polyvinylchloride, vinylchloride-vinyl acetate copolymers, vinylidene chloride homopolymers and copolymers, ethylene vinyl acetate (EVA), cellophane, polyolefins including polyethylene and polypropylene, polystyrene and the like and combinations thereof. Preferred substrates include fabrics and films, particularly fabrics comprising at least one of polyamide, polyester, cotton, and in one preferred embodiment protective fabric on the opposite foam surface, most preferably charmeuse protective fabric or leather.

Foams made from the reaction of at least one polyol prepolymer described herein and at least one isocyanate manifest heat bondability, especially flame bondability, and/or the ability to be welded using high frequency welding, especially ultrasonic welding. Dielectric and hot plate heat bonding are also effective using these foams.

EXAMPLES

The following examples are provided to illustrate the embodiments of the invention, but are not intended to limit the scope thereof. All parts and percentages are by weight unless otherwise indicated:
The following materials were used:
NOPB A: A 3-functional natural oil polyol prepared using fatty acids from soy oil. It has a primary hydroxyl content of 100 percent with a hydroxyl number (OH#) of 89. It is made by reacting hydroxymethylated soybean fatty acid methyl esters with a 625 molecular weight poly(ethylene oxide) triol made by ethoxylation at 120° C. of glycerol until an equivalent weight of 209 is reached using 0.3 percent final level of KOH and finishing with synthetic magnesium silicate as known in the skill in the art and taught in such references as *Polyurethane Handbook, Chemistry, Raw Materials, Processing, Application, Properties* edited by G. Oertel, Hamer publisher (1993, second edition) section 3.1.1.2, at a 4:1 molar ratio, using 500 ppm of stannous octoate as the catalyst. The resulting polyether-polyester has a viscosity of 2,700 mPa·s at 21° C., a hydroxyl equivalent weight of 640, Mn of 2500, Mw of 3550, and a polydispersity of 1.44. NOPB A has an average of approximately 3.0 hydroxyl groups/molecule. NOPB A contains approximately 70 percent Natural Oil.

NOPB B: A 3-functional natural oil polyol prepared using fatty acids from soy oil and has a primary hydroxyl content of 100 percent with a hydroxyl number (OH#) of 47. It is made by reacting hydroxymethylated soybean fatty acid methyl esters with a 450 equivalent weight poly(ethylene oxide) triol, at a 7.9:1 molar ratio, using 946 ppm stannous octoate as the catalyst. The resulting polyether-polyester has a viscosity of 5,700 mPa·s at 25° C., a hydroxyl equivalent weight of 1,188, Mn of 5,180, and a polydispersity of 1.69. NOPB B contains approximately 65 percent Natural Oil.

BIOH: A soybean oil based polyol available from Cargill.

SPECFLEX* NC 630E: A high functionality capped polyol with a Hydroxyl number of between 29.0 and 33.0. Available from The Dow Chemical Company.

SPECFLEX* NC 632: A high functionality capped polyol with a Hydroxyl number of between 30.5 and 34.5 Available from The Dow Chemical Company.

SPECFLEX* NC 700: A grafted polyether polyol containing 40% copolymerized styrene and acrylonitrile (SAN). Available from The Dow Chemical Company.

SPECFLEX* TM 20: A 80% Voranate T-80 (80% 2,4-toluene diisocyanate and 20% 2,6-toluene diisocyanate by weight) and 20% Voranate M-229 (a polymeric MDI) by weight blend available from The Dow Chemical Company Polyol A: A 1,000 equivalent weight mixed feed ethylene oxide/propylene oxide tetrol initiated with 3,3'-diamino-N-methyl-dipropylamine and containing 12% ethylene oxide.

Polyol B: A 1,700 equivalent weight propoxylated tetrol initiated with 3,3'-diamino-N-methyl-dipropylamine and capped with 18% ethylene oxide.

VORANOL* 3008: An all propylene oxide triol with an OH number of 56 available from The Dow Chemical company.

DESMOPHEN* 2200: A polyester polyol with an OH number of 60, available from Bayer Aktiengesellschaft.

VORANOL* CP 3322: A polyoxypropylene polyoxyethylene triol with an OH number of 48 available from The Dow Chemical Company.

KOSMOS 29: A stannous octoate catalyst available from Evonik Industries.

DABCO MB 20: A bismuth based catalyst available from Air Products & Chemicals Inc.

DABCO 33LV: A 33% solution of Triethylenediamine in propylene glycol available from Air Products & Chemicals Inc.

DEOA: 99% purity diethanolamine available from Sigma-Aldrich, Inc.

DMEA: A dimethyl ethanol amine catalyst, available from Sigma-Aldrich, Inc.

NIAX A-1: A tertiary amine catalyst available from Momentive Performance Materials.

NIAX A-300: A tertiary amine catalyst available from Momentive Performance Materials.
NIAX A-300: A tertiary amine catalyst available from Momentive Performance Materials
NIAX L 598: A silicone surfactant available from Momentive Performance Materials.
MAX L 620: A silicone surfactant available from Momentive Performance Materials.
NIAX L 530: A silicone surfactant available from Momentive Performance Materials.
TEGOSTAB B-8715LF: A silicone-based surfactant available from Degussa-Goldschmidt Corporation.
VORANATE* T-80: A toluene diisocyanate (80% 2,4-toluene diisocyanate and 20% 2,6-toluene diisocyanate by weight) composition available from The Dow Chemical Company.
VORANATE* M 229: A polymeric diphenylmethane diisocyanate available from The Dow Chemical Company.
*VORANOL, SPECFLEX and VORANATE are trademarks of The Dow Chemical Company. Niax is a trademark of Momentive Performance. Kosmos and Tegostab are trademarks of Evonik. Dabco is a trademark of APCI. Desmophen is a trademark of Bayer.

Prepolymer Preparation (Examples E1 and E2, Comparative Example C1)

Prepolymers based on NOPB A and polyol A and either TDI or MDI isocyanates are prepared by first blending the two polyols followed by the addition of the isocyanate. The prepolymers are then left to polymerize at room temperature for 24 hours. The amounts of polyols and isosyanates used, along with the viscosity of the resulting prepolymer, are given in Table 1:

TABLE 1

|  | C1 | E1 | E2 |
|---|---|---|---|
| NOPB A | 80 | 78 | 78 |
| Polyol A | 20 | 20 | 20 |
| VORANATE T-80 |  | 2 |  |
| VORANATE M 229 |  |  | 2 |
| Isocyanate index |  | 16 | 10 |
| Viscosity (mPa · s) | 2,000 | 4,920 | 4,610 |

The viscosity is measured by using a cone and plate Haake PK 100 viscosimeter with products conditioned at 25° C.

Comparative Example C1 is a blend of polyols and not a prepolymer as the polyol blend is not reacted with an isocyanate at this point. Prepolymer examples E1 and E2 have higher viscosities than the polyol blend of comparative example C1.

Foam Preparation (Examples E3-E6, Comparative Example C2)

Foams (Examples E3-E5 and Comparative Example C2) are made in the laboratory by preblending the components, except for the isocyanate, of Table 2, all conditioned at 25° C. The isocyanate separately is also conditioned at 25° C. The reactants are mixed in a plastic cup using a stirrer at 2,000 RPM for 5 seconds, then they are poured in a 20×20×20 cm cardboard box and left to rise freely.

TABLE 2

|  | C2 | E3 | E4 | E5 | E6 |
|---|---|---|---|---|---|
| VORANOL CP 3322 | 50 | 49 | 49 | 49 | 49 |
| Polyol blend C1 | 50 |  |  |  |  |
| Prepolymer E1 |  | 51 |  | 51 |  |
| Prepolymer E2 |  |  | 51 |  | 51 |
| Water | 2.8 | 2.8 | 2.8 | 2.8 | 2.8 |
| KOSMOS 29 | 0.03 | 0.03 | 0.03 |  |  |
| DABCO MB 20 |  |  |  | 0.20 | 0.20 |
| DABCO 33 LV | 0.15 | 0.15 | 0.15 | 0.15 | 0.15 |
| NIAX A-1 | 0.03 | 0.03 | 0.03 | 0.03 | 0.03 |
| NIAX L 598 | 1.0 | 1.0 | 1.0 | 1.0 | 1.0 |
| VORANATE T-80 index | 105 | 105 | 105 | 105 | 105 |
| Foam weight (g) | 245 | 245 | 235 | 246 | 243 |
| Observation | Slight shrinkage | Slight shrinkage | Total shrinkage | Good foam | Slight shrinkage |

These foaming results show that prepolymer E1 gives a flexible foam (example E3) comparable to the control. However, prepolymer E2, most likely due to the higher functionality of the isocyanate used to produce it, gives tighter foam (example E4). When Dabco MB 20, a weak gelling catalyst, is substituted for Kosmos 29, a strong gelling catalyst, both foams are better or comparable to the control (examples E5 and E6).

Polyol Compatibilty (E7-10, C3 and C4)

Prepolymers (E7 and E8) are made by blending the polyols and isocyanates of Table 3, and stirring at 2000 RPM for 10 seconds. The mixture is let to react overnight at room temperature. Control polyol blends (C3 and C4) are also prepared according to the amounts given in Table 3. The prepolymers (E7 and E8) and the control polyol blends (C3 and C4) are then stirred with water at 20000 RPM for 10 seconds and stored overnight and the visual characteristics recorded.

TABLE 3

|  | E7 | E8 | C3 | C4 |
|---|---|---|---|---|
| NOPB A | 140 | 113.8 | 140 | 112 |
| Polyol B | 60 | 48.8 | 60 | 48 |
| SPECFLEX NC 700 |  | 32.5 |  | 32 |
| VORANATE T-80 (g) | 4 | 3 |  |  |
| Isocyanate index | 18 | 16 |  |  |
| Prepolymer Observation | One Phase, Clear Blend | One Phase, Milky Blend |  |  |
| Amount of water added (g) | 10 | 10 | 10 | 8 |
| Observation after 48 hours | One Phase Clear Blend | One Phase Milky Blend | One Phase Hazy Liquid | Two Phases Bottom Phase Milky Top Phase Clear |

Examples E7 and E8 based on prepolymers show increased compatibility with other polyols and water.

The prepolymer E7 is used in preparing molded foam. The reactants are mixed in a plastic cup using a stirrer at 2,000 RPM for 5 seconds, then poured into a 300×300×100 mm aluminium mold, heated at 60° C., equipped with vent-holes. The mold release agent is Kluber 41-2038, available from Chem-Trend. The resulting foam is Example E9 (Table 4).

TABLE 4

|  | E9 |
|---|---|
| Prepolymer E7 | 60 PHP |
| SPECFLEX NC 630 E | 30 |

TABLE 4-continued

|  | E9 |
| --- | --- |
| SPECFLEX NC 700 | 10 |
| Water | 3.5 |
| DEOA | 0.7 |
| DABCO 33 LV | 0.3 |
| NIAX A-300 | 0.1 |
| TEGOSTAB B 8715 LF | 0.6 |
| VORANATE T-80 index | 90 |
| Mold exit time (sec.) | 28 |
| Demolding time (min.) | 5 |
| Molded density (kg/m$^3$) | 37 |

Foam preparation (Examples E10-E15, C5 and C6)

Three prepolymers, E10, E11, and E12, are made by first blending 50/50 by weight Voranol CP 3008 and NOBP A, then adding Voranate T-80 at indexes 30, 33, and 36, respectively, and stirring at 2,000 RPM for 2 minutes. The reactants are then placed in an oven at 70° C. for 6 hours. These 3 prepolymers become milky liquids overnight and have the following viscosities at 25° C.:

TABLE 5

|  | E10 | E11 | E12 |
| --- | --- | --- | --- |
| Voranate T-80 Index | 30 | 33 | 36 |
| Grams TDI/100 grams polyol | 3.38 | 3.72 | 4.06 |
| Viscosity mPa · s | 3,730 | 4,550 | 6,500 |

Other prepolymers prepared with indexes 44 and 60 were of much higher viscosities. By comparison, a polyol blend of the 50/50 by weight Voranol CP 3008 and NOBP A has a viscosity of 710 mPa·s at 25° C. It may be noted that NOPBA contains primary hydroxyls, while Voranol CP 3008 are based on secondary hydroxyls, hence the reaction of NOBPA with Voranate T-80 may be favored. Additionally it is known that the NCO on the 4 position of the TDI aromatic ring is more reactive than the 2 and 6 NCO's.

Foams are prepared as follows: 200 grams polyester polyol 200, grams polyol blend, or 200 grams prepolymer E10, E11, or E12 are weighted in a 500 ml plastic cup. The amount of TDI needed for the foaming is added and the mixture hand mixed using a tongue depressor such as to avoid air entrapment. Using a stirrer without propeller (only two vertical blades with rounded edges) at 500 RPM for 30 seconds, the isocyanate is mixed with the polyol. The stirrer speed is then increased to 1200 RPM. Tin catalyst (if needed) is added during stirring, and an activator blend (water, catalysts, surfactant) is added through a syringe into the stirring reactants. After 10 seconds of stirring and before the reactants start creaming, the reactants are poured into a 20 cm×20 cm×20 cm cardboard box and foam is allowed to rise. Rise times are recorded in Table 6.

Foam density is measured according to ASTM D3574-95 after removal of any skin that forms on the surface of a molded or free rise foam pad.

50% CFD is a measure of the compression deflection of a flexible material (for instance, foam) measured as the force in kPa required to compress a 5 cm thick sample no smaller than 100 cm square, to 50 percent deflection after 4 precycles. The CFD is measured according to the procedures of DIN 53577

Air flow is the volume of air which passes through a 1.0 inch (2.54 cm) thick 2 inch×2 inch (5.08 cm) square section of foam at 125 Pa (0.018 psi) of pressure. Units are expressed in cubic decimeters per second and converted to standard cubic feet per minute. A representative commercial unit for measuring air flow is manufactured by TexTest AG of Zurich, Switzerland and identified as TexTest Fx3300. This measurement follows ASTM D 3574 Test G.

Resilience refers to the quality of a foam perceived as springiness. It is measured according to the procedures of ASTM D3574 Test H. This ball rebound test measures the height a dropped steel ball of known weight rebounds from the surface of the foam when dropped under specified conditions and expresses the result as a percentage of the original drop height.

TABLE 6

|  | OH No | C5 | E13 | E14 | E15 | C6* |
| --- | --- | --- | --- | --- | --- | --- |
| DESMOPHEN 2200 | 60 | 100 |  |  |  |  |
| Prepolymer E10 | 50.7 |  | 100 |  |  |  |
| Prepolymer E11 | 48.5 |  |  | 100 |  |  |
| Prepolymer E12 | 46.5 |  |  |  | 100 |  |
| NOPB A | 79 |  |  |  |  | 50 |
| VORANOL 3008 | 56 |  |  |  |  | 50 |
| Water | 6233 | 3.9 | 3.9 | 3.9 | 3.9 | 3.9 |
| SnO | 1649 |  | 0.05 | 0.05 | 0.05 | 0.05 |
| DABCO 33 LV | 580 |  | 0.2 | 0.2 | 0.2 | 0.2 |
| NIAX L620 | 0 |  | 0.8 | 0.8 | 0.8 | 0.8 |
| NIAX A-1 | 271 | 0.05 | 0.05 | 0.05 | 0.05 | 0.05 |
| DMEA | 623 | 0.4 |  |  |  |  |
| NIAX L530 |  | 0.8 |  |  |  |  |
| TOTAL PARTS |  | 105.2 | 105 | 105 | 105 | 105 |
| Water Content Of The Blend |  | 3.71 | 3.71 | 3.71 | 3.71 | 3.71 |
| OH number of The Polyol Blend |  | 59.56 | 50.3 | 48.21 | 46.3 | 66.3 |
| VORANATE T-80 | 48.2 | 1 | 1 | 1 | 1 | 1 |
| Index |  | 105 | 105 | 105 | 105 | 105 |
| Grams isocyanate per 100 g polyol blend |  | 47.43 | 45.97 | 45.63 | 45.32 | 48.58 |
| Ratio: P/I |  | 2.11 | 2.18 | 2.19 | 2.21 | 2.06 |
| Observations during mixing |  |  |  |  |  | splashing |
| Rise time (Seconds) |  | 80 | 120 | 120 | 120 | 110 |
| Cell Count per cm of foam |  | 14-15 | 21-22 | 20-21 | 19-20 | NA |
| Foam Density (kg/m$^3$) |  | 27.6 | 28.7 | 28.3 | 28.2 | 25.1 |

TABLE 6-continued

|  | OH No | C5 | E13 | E14 | E15 | C6* |
|---|---|---|---|---|---|---|
| 50% CFD (Kpa) |  | 5.3 | 5.5 | 5.5 | 5.2 | 4.1 |
| Airflow (cfm) |  | 0.0 | 0.34 | 0.11 | 0.26 | 0.03 |
| Prepolymer Viscosity at 25° C. (mPa·s) |  |  | 3,730 | 4,550 | 6,500 |  |
| Polyol viscosity at 25° C. (mPa·s) |  | 12,000 |  |  |  | 710 |

*Top Shrinks. Tight Skins. Impossible to increase mixer speed to 1,200 RPM due to splashing.

The examples show that through the use of the high viscosity prepolymers, it is possible to control foam cell structure such that it is similar to the foam cell structure obtained when using a polyester polyol. Using even higher prepolymer viscosities (viscosities closer to those of polyester polyols), can further improve control of the foam cell structure. Additionally the foam hardness is increased by using prepolymers, hence isocyanate usage could be further reduced, saving foam cost.

Foam Preparation (Examples E16, E17, C7 and C8)

Molded foam Examples E16 and E17 are made by pouring 5% by weight of the isocyanate into the polyol blend prior to adding water and catalysts and stirring for 5 seconds at 2,000 RPM. Then, water and catalysts are added and mixed for 30 seconds before pouring the remaining 95% by weight of the isocyanate under stirring for 5 additional seconds, before transferring the reactants in the mold as described for Example E9. Control foams C7 and C8 are made by first combining the polyols, water, and catalysts, then adding the isocyanate under stirring, before transferring the reactants in the mold as described for Example E9.

TABLE 7

|  | C7 | E16 | C8 | E17 |
|---|---|---|---|---|
| SPECFLEX NC 632 | 55 | 55 | 47 | 47 |
| SPECFLEX NC 700 | 10 | 10 | 10 | 10 |
| BIOH | 35 | 35 |  |  |
| NOPB B |  |  | 43 | 43 |
| Water | 3.0 | 3.0 | 3.0 | 3.0 |
| DEOA 99% | 0.7 | 0.7 | 0.7 | 0.7 |
| DABCO 33 LV | 0.3 | 0.3 | 0.3 | 0.3 |
| NIAX A-1 | 0.05 | 0.05 | 0.05 | 0.05 |
| NIAX A-300 | 0.1 | 0.1 | 0.1 | 0.1 |
| TEGOSTAB B-8715 LF | 0.5 | 0.5 | 0.5 | 0.5 |
| TEGOSTAB B-8719 LF |  |  |  |  |
| SPECFLEX TM20 index | 100 | 100 | 100 | 100 |
| % renewable/foam | 22.7 | 22.7 | 20.3 | 20.3 |
| Mold exit time (s) | 48 | 41 | 31 | 31 |
| Demolding time (min) | 6 | 6 | 6 | 6 |
| Part weight (g) | 411 | 395 | 430 | 428 |
| Core density | 42.3 | 39.6 | 45.2 | 44.2 |
| 50% CFD (KPa) | 4.0 | 5.0 | 5.5 | 5.0 |
| Resiliency (%) | 47 | 46 | 51 | 50 |
| 70% Wet Cs skin | 49.8 | 51.8 | 23.0 | 21.4 |
| 50% CS (% CD) | 14.2 | 17.8 | 11.8 | 10.1 |
| 75% CS (% CD) | 12.3 | 13.2 | 10.1 | 9.4 |
| Tensile Strength (KPa) | 60 | 94 | 86 | 101 |
| Elongation (%) | 87 | 100 | 94 | 108 |

From Table 7 it can be seen that improvements in Foam Tensile Strengths and Elongations are obtained using the prepolymer technique while other foam properties are maintained.

While the foregoing is directed to embodiments of the present invention, other and further embodiments of the invention may be devised without departing from the basic scope thereof, and the scope thereof is determined by the claims that follow.

The invention claimed is:

1. A polyol prepolymer having at least one urethane group, comprising a reaction product of at least one isocyanate and a polyol blend, wherein the polyol blend comprises at least one petroleum-based polyol and at least one natural oil based polyol, the isocyanate is reacted at an isocyanate index of between about 5 and about 80, the polyol prepolymer has a viscosity of between about 3000 mPa·s and about 30000 mPa·s at 25° Celsius, and wherein the at least one natural oil based polyol comprises the reaction product of at least a hydroxymethylated fatty acid or hydroxymethylated fatty acid-ester with an initiator compound.

2. A flexible polyurethane foam, comprising a reaction product of at least:
a) at least one polyol prepolymer, wherein the at least one polyol preoplymer comprises a reaction product of at least one first isocyanate and a polyol blend, wherein the polyol blend comprises at least one petroleum-based polyol and at least one a natural oil based polyol, the at least one first isocyanate is reacted at an isocyanate index of between about 5 and about 80, and the polyol prepolymer has a viscosity of between about 3000 mPa·s and about 30000 mPa·s at 25° Celsius, and wherein the at least one natural oil based polyol comprises the reaction product of at least a hydroxymethylated fatty acid or hydroxymethylated fatty acid-ester with an initiator compound; and
b) at least one second isocyanate.

3. A method for producing a polyol prepolymer, comprising:
providing a polyol blend comprising at least one petroleum-based polyol and at least one natural oil based polyol, wherein the at least one natural oil based polyol comprises the reaction product of at least a hydroxymethylated fatty acid or hydroxymethylated fatty acid-ester with an initiator compound; and
reacting the polyol blend with at least one isocyanate at an isocyanate index of between about 5 and about 80 to form the at least one polyol prepolymer, such that the polyol prepolymer has a viscosity of between about 3000 mPa·s and about 30000 mPa·s at 25° Celsius.

4. A method for producing a flexible polyurethane foam, comprising:
forming at least one polyol prepolymer in a process comprising:
providing a polyol blend comprising at least one petroleum-based polyol and at least one natural oil based polyol, wherein the at least one natural oil based polyol comprises the reaction product of at least a hydroxymethylated fatty acid or hydroxymethylated fatty acid-ester with an initiator compound, and
reacting the polyol blend with at least one first isocyanate at an isocyanate index of between about 5 and about 80 to form the at least one polyol prepolymer, such that the polyol prepolymer has a viscosity of between about 3000 mPa·s and about 3000 mPa·s at 25° Celsius, and reacting at least the at least one polyol prepolymer with at least one second isocyanate to form a polyurethane foam.

5. The polyol prepolymer of claim 1, wherein the at least one natural oil based polyol comprises hydroformylated fatty acid methyl esters.

6. The polyol prepolymer of claim 1, wherein the polyol prepolymer has one liquid phase.

7. The polyol prepolymer of claim 1, wherein the polyol prepolymer, upon mixing with water at water concentrations of up to about 20% based on the total weight of polyol pre-opolymer and water, forms one phase with the water.

8. The polyol prepolymer of claim 1, wherein the at least one natural oil based polyol and the at least one petroleum-based polyol are present in a ratio of between about 20:80 and about 80:20 based on the total weight of the at least one natural oil based polyol and the at least one petroleum-based polyol.

9. The polyol prepolymer of claim 1, wherein the polyol prepolymer has an OH number of between about 100 and about 5.

10. The polyol prepolymer of claim 1, wherein the polyol prepolymer has a viscosity of between about 3000 mPa·s and about 7000 mPa·s at 25° Celsius.

11. The flexible polyurethane foam of claim 2, wherein the flexible polyurethane foam is at least one of laminated to a fabric and welded to plastic by ultrasonic waves.

12. The flexible polyurethane foam of claim 2, wherein the at least one first isocyanate ant the at least one second isocyanate are the same.

13. The flexible polyurethane foam of claim2, wherein the at least one first isocyanate and the at least one second isocyanate are the same.

14. The flexible polyurethane foam of claim 2, wherein the at least one first isocyanate and the at least one second isocyanate are the different.

15. The flexible polyurethane foam of claim 2, wherein the at least one natural oil based polyol comprises hydroformylated fatty acid methyl esters.

16. The method of claim 3, wherein the at least one natural oil based polyol comprises hydroformylated fatty acid methyl esters.

17. The method of claim 4, wherein the at least one natural oil based polyol comprises hydroformylated fatty acid methyl esters.

18. The flexible polyurethane foam of claim 2, wherein the polyol prepolymer, upon mixing with water at water concentrations of up to about 20% based on the total weight of polyol preopolymer and water, forms one phase with the water.

19. The method of claim 3, wherein the polyol prepolymer, upon mixing with water at water concentrations of up to about 20% based on the total weight of polyol preopolymer and water, forms one phase with the water.

20. The method of claim 4, wherein the polyol prepolymer, upon mixing with water at water concentrations of up to about 20% based on the total weight of polyol preopolymer and water, forms one phase with the water.

* * * * *